United States Patent [19]
Trokhan

[11] Patent Number: 5,832,362
[45] Date of Patent: Nov. 3, 1998

[54] APPARATUS FOR GENERATING PARALLEL RADIATION FOR CURING PHOTOSENSITIVE RESIN

[75] Inventor: Paul Dennis Trokhan, Hamilton, Ohio

[73] Assignee: The Procter & Gamble Company, Cincinnati, Ohio

[21] Appl. No.: 799,852

[22] Filed: Feb. 13, 1997

[51] Int. Cl.$^6$ ..................................................... B01J 19/12
[52] U.S. Cl. ........................................................... 422/186.3
[58] Field of Search ........................................... 422/186.3

[56] References Cited

U.S. PATENT DOCUMENTS

| | | | |
|---|---|---|---|
| 4,005,135 | 1/1977 | Helding | 250/527 |
| 4,010,374 | 3/1977 | Ramler | 250/492 R |
| 4,037,112 | 7/1977 | Ramler et al. | 250/527 |
| 4,208,587 | 6/1980 | Eastlund et al. | 250/492 R |
| 4,389,115 | 6/1983 | Richter | 355/26 |
| 4,444,487 | 4/1984 | Miller et al. | 355/3 FU |
| 4,514,345 | 4/1985 | Johnson et al. | 264/22 |
| 4,528,239 | 7/1985 | Trokhan | 428/247 |
| 4,529,480 | 7/1985 | Trokhan | 162/109 |
| 4,637,859 | 1/1987 | Trokhan | 162/109 |
| 5,334,289 | 8/1994 | Trokhan et al. | 162/358.2 |
| 5,514,523 | 5/1996 | Trokhan et al. | 430/320 |

FOREIGN PATENT DOCUMENTS

| | | |
|---|---|---|
| 0 437 847 A1 | 7/1991 | European Pat. Off. . |
| 0 756 034 A1 | 1/1997 | European Pat. Off. . |
| 2 626 134 | 7/1989 | France . |
| WO 91/14558 | 10/1991 | WIPO . |
| WO92/17733 | 10/1992 | WIPO . |

OTHER PUBLICATIONS

Literature from Fusion UV Curing Systems: EPIQ 6000: The Next Dimesnion in UV Curing; Fusion Ultraviolet Cauring Systems Industrial Power Supply; Fusion UV Curing Systems DRS 111 & DRS 120 Conveyors.

Fusion Systems Benchtop Conveyor Model MC–6; Fusion Ultraviolet Curing Systems Model F450; Fusion Ultraviolet Curing System Model F300; Fusion Focus, vol. 5/No. 1/Sep., 1985.

Fusion's Super Six (F200R) Ultraviolet Curing System; Fusion's Conveyorized Ultraviolet Curing Systems.

Fusion's Conveyorized Ultraviolet Curing Systems for Flat Glass Production Lines; and The F450 Lamp System: Graphic Results.

Literature from Fusion Semiconductor Systems: For a Look at the Future of Multilayer Processing and Photoresist Stabilization . . . Turn on the Microlite™; Introducing the MICROLITE™ 150 PC Photostabilizer for 6–inch Wafers; and MICROLITE™; Now You Can Be More Critical.

*Primary Examiner*—Daniel J. Jenkins
*Attorney, Agent, or Firm*—Vladmir Vitenberg; Larry L. Huston; E. Kelly Linman

[57] ABSTRACT

An apparatus of parallel radiation for curing a resin to produce a resinous framework of a papermaking belt is provided. The apparatus comprises a source of radiation and an elongate reflector having an outer surface, an inner surface, a longitudinal axis, and two ends spaced apart along the longitudinal axis. The inner surface is comprised of a plurality of reflective facets oriented parallel to the longitudinal axis. In its cross-section, the reflector has a concave shape having a cross-sectional axis perpendicular the longitudinal axis. The reflective facets have a common focal point in the cross-section. The reflective facets direct radiation substantially parallel to the cross-sectional axis. Preferably, the plurality of reflective facets form the reflector's inner surface having a parabolic or circular macro-scale shape in the cross-section.

17 Claims, 4 Drawing Sheets

APPARATUS FOR GENERATING PARALLEL RADIATION FOR CURING PHOTOSENSITIVE RESIN

FIELD OF THE INVENTION

The present invention is related to processes of making papermaking belts comprising a reinforcing structure joined to a resinous framework. More particularly, the present invention is concerned with an apparatus for curing a photosensitive resin to produce the resinous framework of a papermaking belt, which apparatus generates substantially parallel reflected radiation.

BACKGROUND OF THE INVENTION

Paper products are used for a variety of purposes. Paper towels, facial tissues, toilet tissues, and the like are in constant use in modern industrialized societies. The large demand for such paper products has created a demand for improved versions of the products.

Generally, the papermaking process includes several steps. An aqueous dispersion of the papermaking fibers is formed into an embryonic web on a foraminous member, such as Fourdrinier wire, or a twin wire paper machine, where initial dewatering and fiber rearrangement occurs.

In a through-air-drying process, after the initial dewatering, the embryonic web is transported to a through-air-drying belt comprising an air pervious deflection member. The deflection member may comprise a patterned resinous framework having a plurality of deflection conduits through which air may flow under a differential pressure. The resinous framework is joined to and extends outwardly from a woven reinforcing structure. The papermaking fibers in the embryonic web are deflected into the deflection conduits, and water is removed through the deflection conduits to form an intermediate web. The resulting intermediate web is then dried at the final drying stage at which the portion of the web registered with the resinous framework may be subjected to imprinting—to form a multi-region structure.

Through-air drying papermaking belts comprising a reinforcing structure and a resinous framework are described in commonly assigned U.S. Pat. No. 4,514,345 issued to Johnson et al. on Apr. 30, 1985; U.S. Pat. No. 4,528,239 issued to Trokhan on Jul. 9, 1985; U.S. Pat. No. 4,529,480 issued to Trokhan on Jul. 16, 1985; U.S. Pat. No. 4,637,859 issued to Trokhan on Jan. 20, 1987; U.S. Pat. No. 5,334,289 issued to Trokhan et al on Aug. 2, 1994. The foregoing patents are incorporated herein by reference for the purpose of showing preferred constructions of through-air drying papermaking belts. Such belts have been used to produce commercially successful products such as Bounty paper towels and Charmin Ultra toilet tissue, both produced and sold by the instant assignee.

Presently, the resinous framework of a through-air drying papermaking belt is made by processes which include curing a photosensitive resin with UV radiation according to a desired pattern. The commonly assigned U.S. Pat. No. 5,514,523, issued on May 7, 1996 to Trokhan et al. and incorporated by reference herein, discloses one method of making the papermaking belt using differential light transmission techniques. To make such a belt, a coating of the liquid photosensitive resin is applied to the reinforcing structure. Then, a mask in which opaque regions and transparent regions define a pre-selected pattern is positioned between the coating and a source of radiation, such as UV light. The curing is performed by exposing the coating of the liquid photosensitive resin to the UV radiation from the radiation source through the mask. The curing UV radiation passing through the transparent regions of the mask cure (i.e., solidify) the resin in the exposed areas to form knuckles extending from the reinforcing structure. The unexposed areas (i.e., the areas corresponding to the opaque regions of the mask) remain fluid, i.e., uncured, and are subsequently removed.

The angle of incidence of the radiation has an important effect on the presence or absence of taper in the walls of the conduits of the papermaking belt. Radiation having greater parallelism produces less tapered (or more nearly vertical) conduit walls. As the conduits become more vertical, the papermaking belt has a higher air permeability, at a given knuckle area, relative to the papermaking belt having more tapered walls.

The current apparatuses for curing the resin to produce the papermaking belts comprising the reinforcing structure and the resinous framework include a radiation source (i.e., a bulb) and a reflector having an elliptical shape. Bulbs of the currently used apparatuses need microwave energy to operate. The elliptical shape of the reflector has been chosen because the elliptical shape and its attendant volume helps to maximize the coupling of microwave energy necessary for the bulbs to operate most efficiently. While the elliptical shape of the reflectors of the prior art is efficient with respect to microwave coupling, the elliptical shape of the reflector generates non-parallel, highly off-axis, or "scattered," rays of radiation. The elliptical shape is thus inefficient for curing the photosensitive resin comprising the framework. So far, the equipment manufacturers have not been able to design a reflector that would maximize microwave energy, and at the same time, generate parallel radiation for the most efficient curing of the resin. In some cases, space limitations my also influence the shape of the reflector. Therefore, a means of controlling the angle of incidence of the curing radiation independent of reflector's geometry is required.

One of the means of controlling the angle of incidence of the radiation is a subtractive collimator. The subtractive collimator is, in effect, an angular distribution filter which blocks the UV radiation rays in directions other than those desired. A common subtractive collimator comprises a dark-colored metal device formed in the shape of a series of channels through which the light rays may pass in the desired direction. The U.S. Pat. No. 5,514,523 cited above and incorporated herein by reference discloses the method of making the papermaking belt utilizing the subtractive collimator.

While the subtractive collimator helps to orient the radiation rays in the desired direction, the total radiation energy that reaches the photosensitive resin to be cured is reduced because of loss of the radiation energy in the subtractive collimator.

Therefore, it is an object of the present invention to provide an improved apparatus for curing a photosensitive resin for producing a papermaking belt having the resinous framework, which apparatus significantly reduces the loss of the curing energy.

It is also an object of the present invention to provide an apparatus for curing a photosensitive resin, which apparatus generates substantially parallel curing radiation.

It is a further object of the present invention to eliminate mutual influence, or interdependency, between the reflector's shape and the optical conditions producing the parallel reflected radiation, i.e., to decouple the reflector's shape from its optical effect.

SUMMARY OF THE INVENTION

An apparatus for generating parallel radiation of the present invention may be utilized for curing a resin to produce a resinous framework of a through-air drying papermaking belt. The apparatus comprises a source of radiation and an elongate reflector having an outer surface and an inner surface. The reflector also has a longitudinal axis, and two ends spaced apart in a longitudinal direction parallel to the longitudinal axis. A cross-section of the reflector has a concave shape having a cross-sectional axis perpendicular to the longitudinal axis.

The inner surface of the reflector is comprised of a plurality of reflective facets oriented in the longitudinal direction. In the reflector's cross-section, the reflective facets have a common focal point, preferably disposed at the cross-sectional axis. In one preferred embodiment, the inner surface comprised of the plurality of reflective facets has an essentially parabolic macroscale shape in the cross-section. In another preferred embodiment, the reflector's inner surface comprised of the plurality of reflective facets has an essentially circular macroscale shape in a paraxial region in the cross-section. The reflective facets may be integral. Alternatively, the reflective facets may be adjunct.

The source of radiation, preferably an elongate bulb, is oriented in the longitudinal direction and juxtaposed with, and preferably located at, the common focal point in the cross-section. In the cross-section, the plurality of facets directs a majority of the reflected radiation rays in the direction substantially parallel to the cross-sectional axis.

A liquid photosensitive resin, curable by radiation and having a radiation-facing surface, is disposed in the direction of the radiation. A reinforcing structure is disposed in the direction of the radiation and adjacent to the liquid resin, to be joined to the resinous framework when the resin is cured. Preferably, the radiation-facing surface of the resin is generally perpendicular to the axis of the reflector. A mask having opaque regions and transparent regions defining a pre-selected pattern is positioned between the source of radiation and the radiation-facing surface of the resin. A collimator, preferably a subtractive collimator, may be disposed intermediate the radiation source and the radiation-facing surface of the resin.

DETAILED DESCRIPTION OF THE INVENTION

Figure 1:
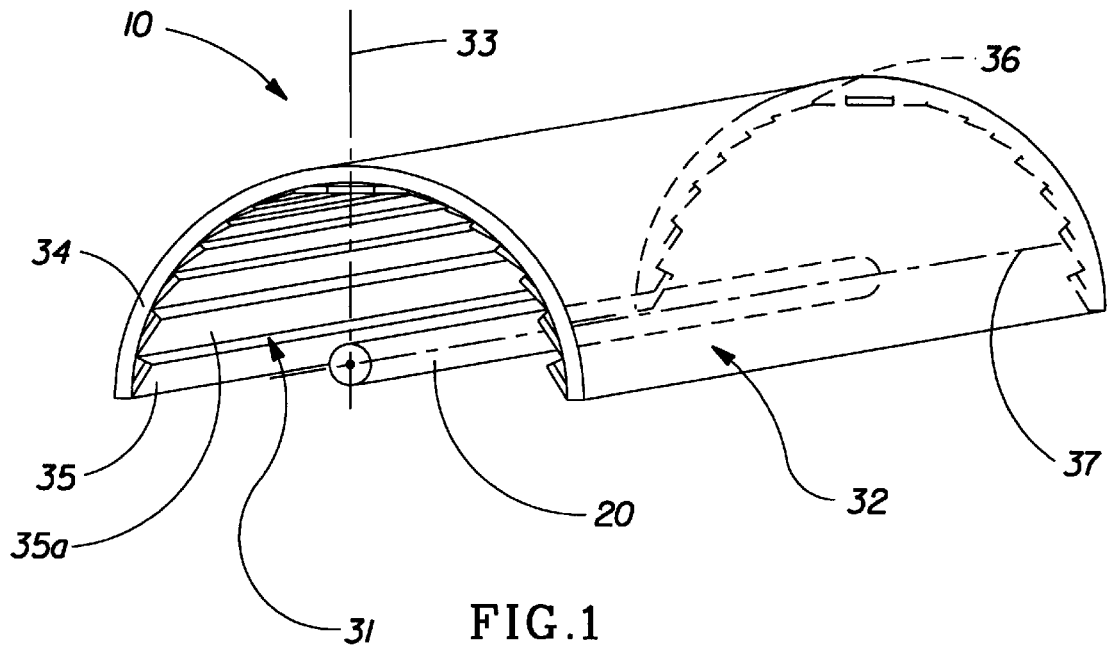
FIG. 1 is a perspective view of the apparatus of the present invention.

FIG. 1 schematically shows an apparatus for generating parallel radiation 10 of the present invention. The apparatus 10 may be utilized for curing a photosensitive resin used for producing a resinous framework of through-air drying papermaking belts. The apparatus 10 of the present invention comprises two primary elements: an elongate reflector 30 and a source of radiation 20.

As illustrated in FIG. 1, the elongate reflector, or simply "reflector," 30 has a longitudinal axis 37 and a pair of ends: a first end 34 and a second end 36. The "longitudinal axis 37" will be defined hereinbelow. The ends 34 and 36 are mutually opposed and spaced apart from each other in a longitudinal direction. As used herein, the "longitudinal direction" is any direction parallel to the longitudinal axis 37 of the reflector 30.

Figure 2:
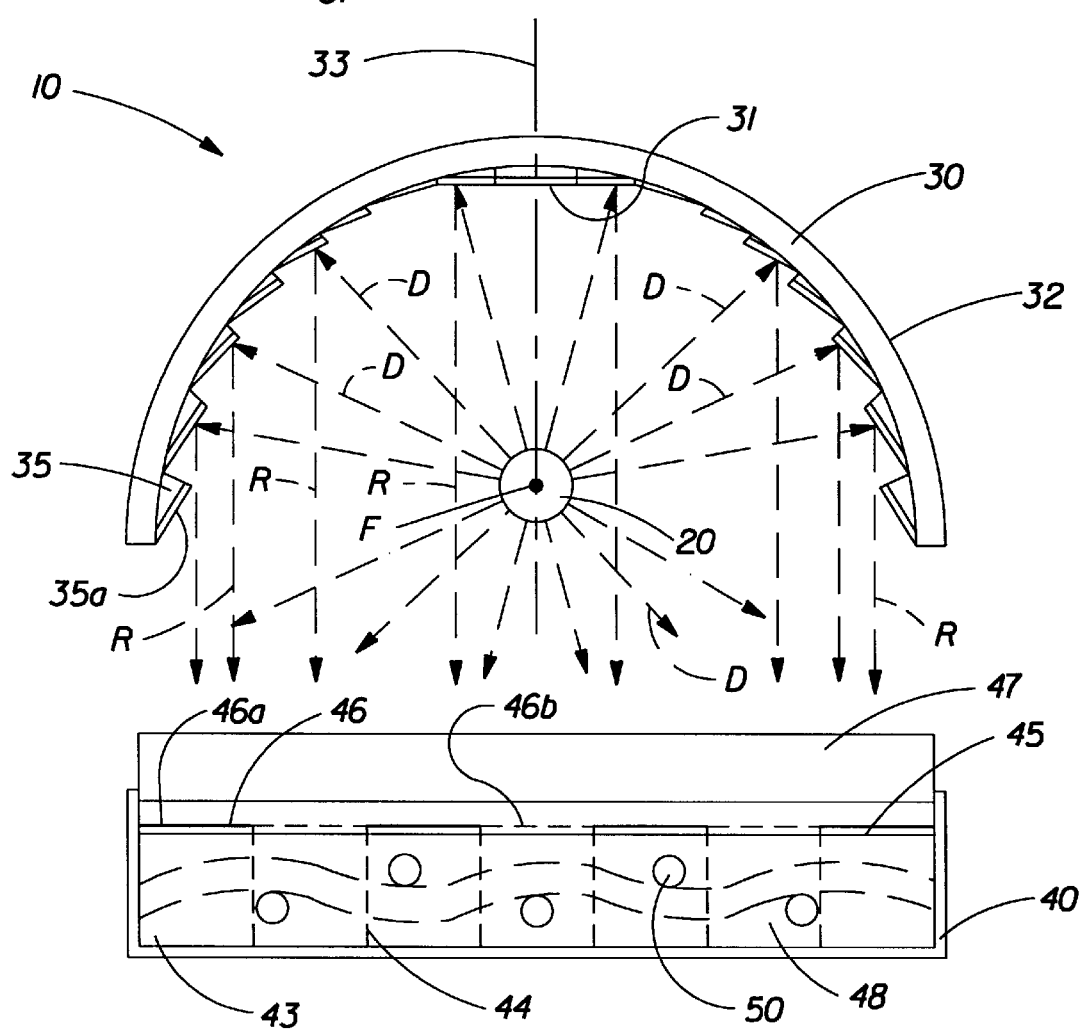
FIG. 2 is a schematic cross-sectional view of the apparatus shown in FIG. 1, showing a reflector having a plurality of integral reflective facets, and also showing a bath containing a liquid photosensitive resin and a reinforcing structure to be encased in the resin.

FIG. 2 shows that the reflector 30 has a concave cross-section. The concave cross-section of the reflector 30 has a cross-sectional axis 33. As used herein, the cross-sectional axis 33 is an imaginary straight line with respect to which the cross-section of the concave reflector 30 is bilaterally symmetrical. The cross-sectional axis 33 is perpendicular to the longitudinal axis 37. One skilled in the art will recognize that an imaginary cross-sectional plane is also perpendicular to the longitudinal axis 37.

The reflector 30 has an inner surface 31 and an outer surface 32. The outer surface 32 may comprise a frame and a mounting means for the reflector 30. The inner surface 31 is a reflective surface of the reflector 30. The inner surface 31 is comprised of a plurality of reflective facets 35 oriented in the longitudinal direction. Each reflective facet 35 has its own reflective surface 35a. Viewed in the cross-section, the reflective facets, or simply "facets," 35 are disposed such that the facets 35 have a common focal point "F," as illustrated in FIG. 2. As used herein, the "common focal point," or "common focus," F defines the point in the cross-section, at which point a majority of the rays reflected from the facets 35 converge, or intersect, if these reflected rays are created by reflection of the rays parallel to the cross-sectional axis 33. This situation is not illustrated but can be easily visualized by reversing the directions of the directional arrows D (direct rays) and R (reflected rays) schematically representing the rays in FIG. 2. Preferably, the focus F is juxtaposed with the cross-sectional axis 33. More preferably, the focus F is located at the cross-sectional axis 33.

In accordance with the law of reflection, if the direction of a reflected ray is reversed, the reflected ray will geometrically coincide with the original incoming direct ray but will have the opposite direction. Paul A. Tipler, *Physics*, page 646, Copyright© 1976 by Worth Publishers, Inc. This book is incorporated by reference herein for the purpose of describing the law of reflection. Therefore, the common focus F is, in other words, a point at which the source of radiation 20 must be disposed in order to cause the original direct rays D generated by the source of radiation 20 to reflect from the facets 35 such that the reflected rays R are substantially parallel to the cross-sectional axis 33. This situation is illustrated in FIG. 2. Now, the longitudinal axis 37 may be defined as an imaginary line running through the common focal point F and perpendicular to the imaginary cross-sectional plane. Preferably, the longitudinal axis 37 is generally parallel to the inner surface 31 of the reflector 30.

Preferably, the plurality of the facets 35 forms the inner surface 31 having a cross-sectional configuration comprising an essentially parabolic or circular macro-scale shape. For the purposes of the present invention, the difference between the parabolic macro-scale shape and the circular macro-scale shape is essentially indistinguishable, as will be explained hereinbelow. It should be pointed out that in the present application, the references to the "cross-sectional axis," "common focal point," shape of the inner surface 31, direct rays D, reflected rays R, and the like elements which are particularly relevant when viewed in the cross-section, should normally be considered in the context of the cross-section shown in FIGS. 2, 3, and 4, unless otherwise indicated.

As used herein, the terms "essentially circular macro-scale shape" or "essentially parabolic macro-scale shape" indicate an overall cross-sectional shape of the inner surface 31 of the reflector 30 when the cross-section of the inner surface 31 is viewed or considered as a whole with regard to its optical effect. In other words, even if an overall geometrical cross-sectional shape of the inner surface 31 is not "essentially parabolic/circular," the inner surface 31 may still have the essentially parabolic/circular macro-scale shape (i. e., the inner surface 31 may still function as if it were parabolic/circular in its geometrical shape). It does not exclude, however, the inner surface having a geometrically essentially parabolic/circular shape in the cross-section. It should also be recognized that the deviations from the absolute spherical or parabolic overall shape are tolerable, although not preferred, as long as the deviations are not substantial enough to adversely affect the performance of the reflector 30. Similarly, it should be recognized that possible transitional areas between two or more adjacent facets are also tolerable, if these transitional areas do not adversely affect the performance of the reflector 30.

In contrast with the cross-sectional "macro-scale shape" of the inner surface 31, a cross-sectional shape of the individual facet 35, particularly, the shape of its reflective surface 35a, defines a "micro-scale shape" of the inner surface 31. As has been described hereinabove, in the cross-section, the plurality of facets 35 reflects the radiation (direct rays D) from the radiation source 20 such that the majority of the reflected rays R are substantially parallel to the cross-sectional axis 33. As shown in FIG. 1, the facets 35 are oriented in and substantially parallel to the longitudinal direction (i. e., the facets 35 are substantially parallel to the longitudinal axis 37). One skilled in the art will readily understand that the number and shape of the facets 35 is dictated primarily by the desired resolution, or fidelity of the plurality of facets 35 to the cross-sectional parabolic or circular macro-scale shape. In FIG. 2, each individual facet 35 is schematically shown as being planar (i. e., having a planar reflective surface 35a). However, the facets 35 may have other shapes, for example, a curvilinear shape.

Figure 5:
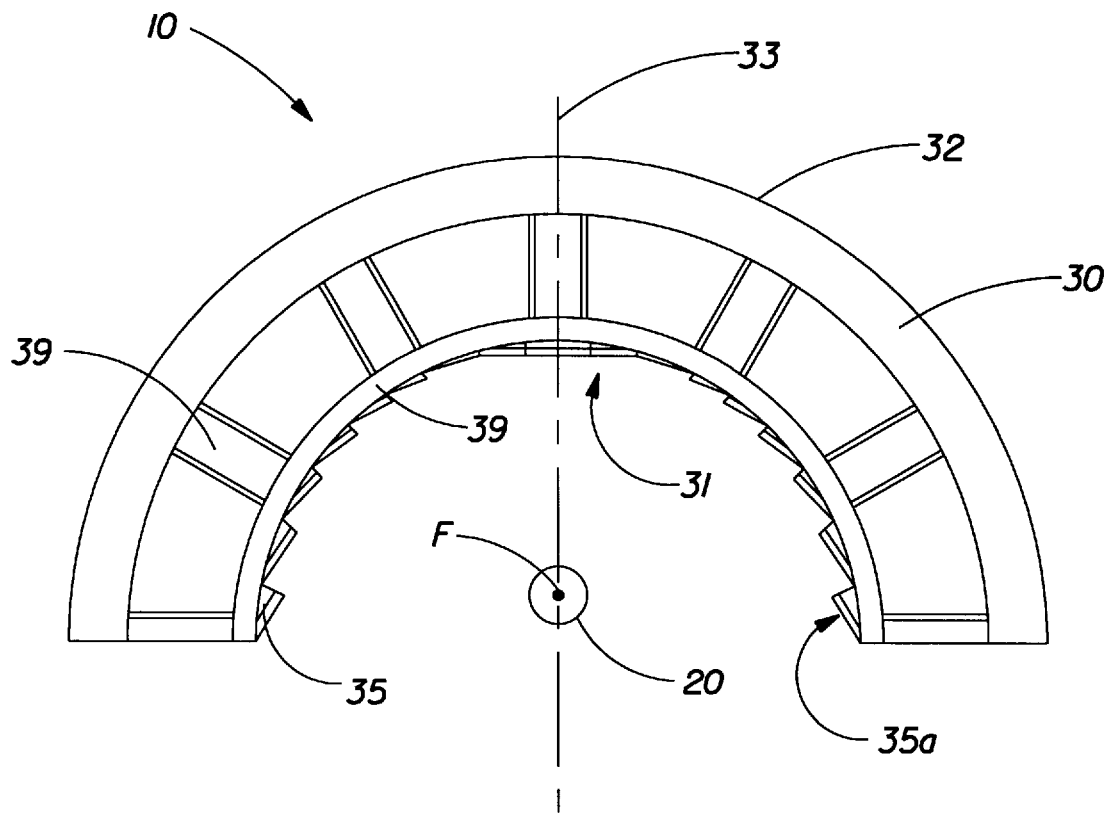
FIG. 5 is a schematic cross-sectional view similar to that shown in FIG. 2 and showing a plurality of adjunct reflective facets mounted on a frame joined to the reflector.

Any suitable means of joining the facets 35 to the reflector 30 may be used to mount the facets 35 to form the inner surface 31. For example, the facets 35 may be shaped directly into the reflector 30 to be an integral part of the body of the reflector 35, as schematically shown in FIG. 2. Such reflective facets 35 are "integral" facets, and may be formed during a molding operation, mechanically, or by any other method known in the art. Alternatively, as shown in FIG. 5, the facets 35 may be mounted on a frame, or housing, 39 which may or may not have an overall parabolic or circular/parabolic shape in the cross-section, and the frame itself could be joined to the reflector 30. The reflector 30 may have plurality of individual housings therein, each individual housing receiving each individual facet 35. Such facets 35, either mounted on the frame 39 or individually joined to the reflector 30, are "adjunct" facets. It should be understood that the reflector 30 may have both types of facets 35: integral and adjunct. The combination of the foregoing means of forming and/or joining facets to the reflector 35, as well as other means known in the art, may be feasible for the present invention.

When the common focal point F is located at the cross-sectional axis 33, the cross-sectional axis 33 coincides with an optical axis of the parabolic or circular macro-scale shape of the inner surface 31 created by the plurality of the reflective facets 35. One skilled in the art will recognize that paraxial parallel rays are normally reflected from a concave spherical (i. e., circular in the cross-section) mirror through the focal point which is disposed at the mirror's optical axis at the distance equal half of the mirror's radius from the mirror's surface. Id., pp. 645–646. As used herein, the paraxial rays are those direct rays D generated by the source of radiation 20 that arrive at comparatively shallow angles with respect to the optical axis, or axis 33, of the reflector 30.

Figure 4:
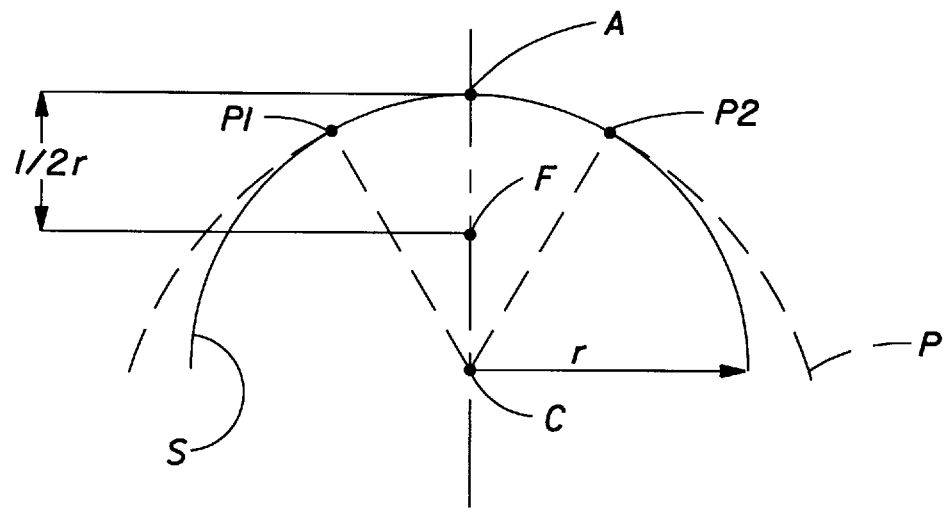
FIG. 4 is a schematic cross-sectional view showing comparison of a circular mirror and a parabolic mirror.

FIG. 4 illustrates what is meant by the "paraxial rays." In FIG. 4, the symbol "S" designates a circle (circular mirror) having its center at the point "C" and its origin at the point "A." The symbol "P" designates a parabola (parabolic mirror) having its focus at the point "F" and its vertex at the point "A." As FIG. 4 illustrates, the parabola P and the circle S have very close (in fact, almost indistinguishable) shapes between the points "P1" and "P2." Beyond these points P1 and P2, significant respective deviations of the shapes of the parabolic mirror P and the circular mirror S begin. The subtended region defined by the lines interconnecting the points P1-C-P2 is a "paraxial region," i. e., the region in the immediate vicinity of the common optical axis of the circle S and the parabola P, where the configuration of the circle S and the configuration of the parabola P are essentially indistinguishable for all practical purposes. Those direct rays D which are within the paraxial region are the paraxial rays. Eugene Hecht, *Optics*, Second Edition, page 159, Copyright © 1987, 1974 by Addison-Wesley Publishing Company, Inc. This book is incorporated by reference herein for the purpose of showing comparison (graphical and mathematical) of parabolic mirrors and circular mirrors. It should be noted that while Tipler and Hecht use a definition "spherical mirror," the Applicant believes that in the present Application, especially in the context of the cross-section, the definition "circular mirror" is more precise and more consistent with the definition "parabolic mirror," both "parabola" and "circle" being flat geometrical figures. As used herein, the term "circular mirror" includes a mirror the cross-section of which is formed by a circular arc up to 180 degrees. It should be understood, however, that three-dimensional spherical mirrors and three-dimensional paraboloid mirrors are also included in the scope of the present invention. According to the present invention, in the cross-sectional paraxial region, the inner surface 31 formed by the plurality of reflective facets 35 has either a circular macro-scale shape or a parabolic macro-scale shape. Outside the paraxial region, the inner surface 31 has a parabolic macro-scale shape.

According to the present invention, the source of radiation 20 is elongate in the longitudinal direction (FIG. 1) and is preferably juxtaposed with the common focus F in the cross-section (FIG. 2). More preferably, in the cross-section the radiation source 20 is disposed at the common focus F located at the cross-sectional axis 33. As has been shown above, when the radiation source 20 is disposed at the common focus F in the cross-section, the concave reflector 30 directs the radiation emitted from the radiation source 20 and reflected from the plurality of facets 35 in the direction substantially parallel to the cross-sectional axis 33.

The preferred source of radiation 20 is an elongate exposure lamp, or bulb extending between the first end 34 and the second end 36 of the reflector 30 and parallel to its longitudinal axis 37. Viewed in the cross-section, the source of radiation 20 emits UV rays in the directions schematically indicated by the directional arrows D (direct rays) and R (reflected rays) in FIG. 2. The source of radiation 20 is selected to provide radiation primarily within the wavelength which causes curing of a liquid photosensitive resin 43 to produce a resinous framework 48. That wavelength is a characteristic of the liquid photosensitive resin 43. As described above, when the liquid photosensitive resin 43 is exposed to the radiation of the appropriate wavelength, curing is induced in the exposed portions of the resin 43. Curing is generally manifested by a solidification of the resin in the exposed areas. Conversely, the unexposed regions remain fluid and are removed (for example, washed away) thereafter.

Any suitable source of curing radiation 20, such as mercury arc, pulsed xenon, electrodeless, and fluorescent lamps, can be used. The intensity of the radiation and its duration depends on the degree of the curing required in the exposed areas. The absolute values of the exposure intensity and time depend upon the chemical nature of the resin, its photosensitivity characteristics, the thickness of the resin coating, and the pattern selected. For the preferred resin, Merigraph resin EPD 1616, this amount ranges from approximately 100 to approximately 1,000 millijoules/cm$^2$.

Figure 3:
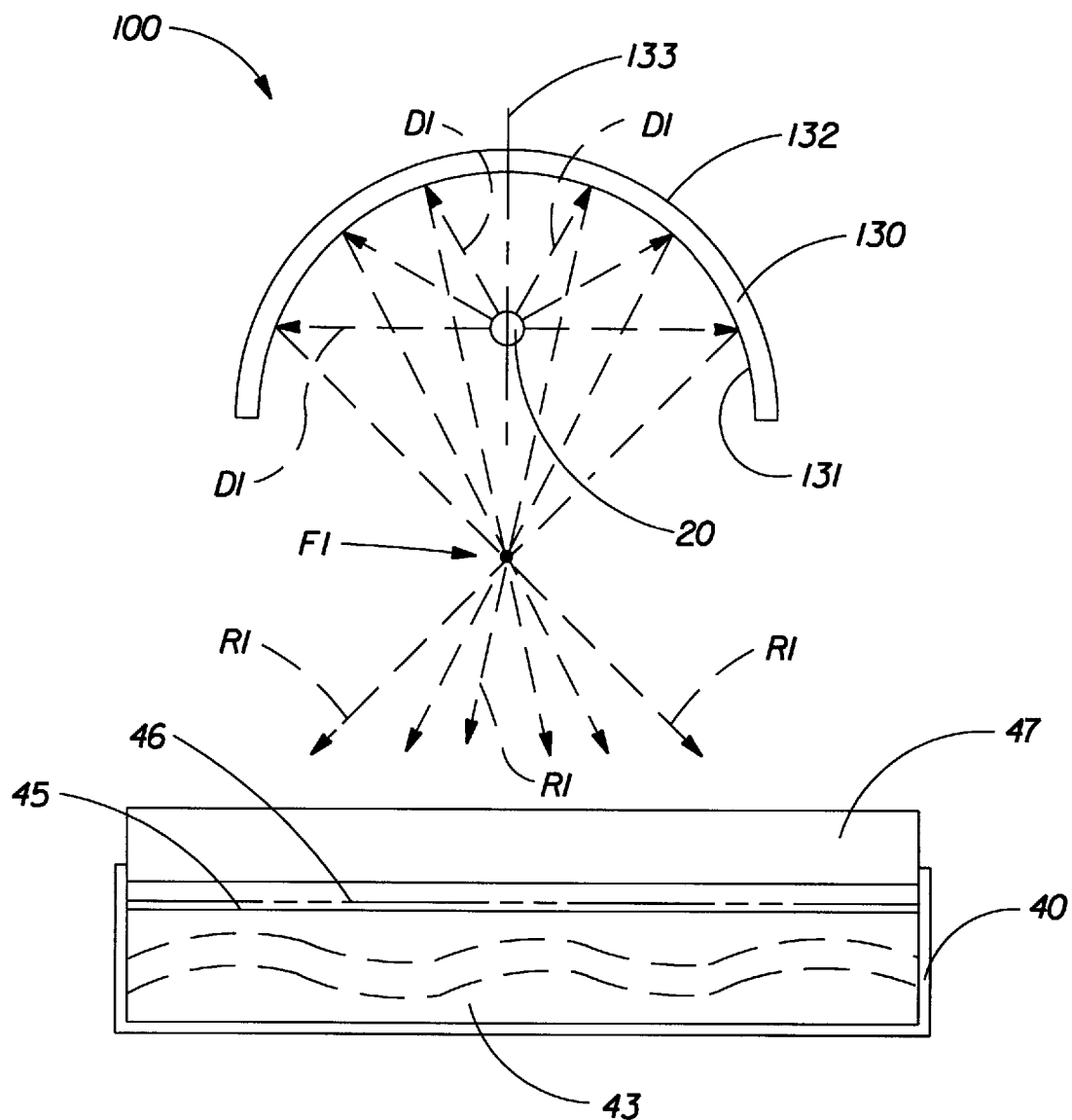
FIG. 3 is a schematic cross-sectional view of the apparatus comprising an elliptical reflector of the prior art.

For comparison, FIG. 3 schematically shows a cross-section of a prior art apparatus 100 for curing a resin. The apparatus 100 of the prior art comprises a reflector 130 having an elliptical inner surface 131 and a source of radiation 120 disposed at an axis 133 of the reflector 130. The rays from the source of radiation 120 are reflected from the elliptical surface 131 and converge at a point F1. The reflected rays then diverge, and the majority of the reflected rays strike the subtractive collimator 47 which blocks a large amount of the reflected rays. It is estimated that in the existing apparatus 100, more than 50% of a total energy received by the resin being cured is a reflected energy. Therefore, the elliptical shape of the reflector 130 of the prior art causes a substantial loss of the total curing energy due to the substantial loss of the reflected energy in the collimator.

In contrast with the prior art apparatus 100, in the apparatus 10 of the present invention the majority of the reflected rays R are substantially parallel to the cross-sectional axis 33 and therefore do not converge/diverge before reaching the radiation-facing surface 45 of the resin 43. Consequently, the majority of the reflected rays R pass collimator 47 without being blocked by the collimator 47 and without losing excessive energy. The collimator 47 is optional and may still be used to block the scattered rays, especially the scattered direct rays from the source of radiation 20, which have directions other than those desired.

As has been pointed out in the Background of the Invention, the elliptical shape of the prior art reflector 130 may be essential for maximizing the amount of energy necessary for effective functioning of the bulbs utilized in the existing apparatus 100. But at the same time, the elliptical shape of the prior art reflector 130 cannot produce the desired parallel reflected rays. The present invention combines the geometrically elliptical shape of the reflector 30 with the optically parabolic or circular macroscale shape of the inner surface 31 of the reflector 30. Thus, the present invention effectively eliminates interdependency between the microwave energy essential for the effectiveness of the source of radiation 20 and parallel radiation essential for the effectiveness of the curing process. In other words, the apparatus of the present invention effectively decouples a geometrical cross-sectional shape of the reflector 30 from the reflector's optical effect.

Figure 6:
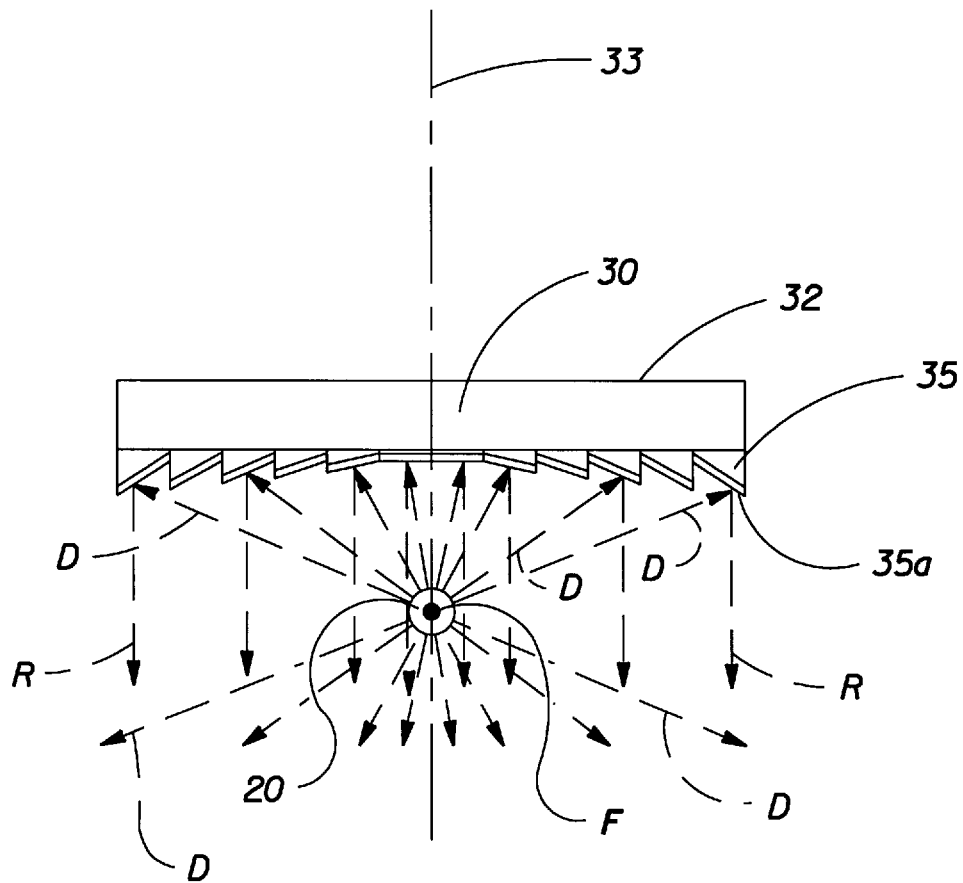
FIG. 6 is a schematic cross-sectional view of the apparatus of the present invention comprising a reflector having an essentially flat geometrical cross-section and an inner surface comprised of a plurality of reflective facets having a common focal point.

Also, space constraints may prevent an equipment manufacturer from making a reflector having a geometrically parabolic or circular cross-sectional shape. Still, by eliminating interdependency between a geometrical shape of the reflector 30 and the reflector's optical effect, the apparatus 10 of the present invention generates parallel radiation regardless of a particular overall cross-sectional shape of the reflector 30. As an example, FIG. 6 shows the reflector 30 having an essentially flat (as opposed to concave) geometrical cross-section. Nevertheless, the inner surface 31 comprised of the plurality of the reflective facets 35 having the common focus F has—in accordance with the present invention—a parabolic or circular macro-scale shape, as it has been explained above.

FIG. 2 schematically illustrates an arrangement in which the photosensitive resin 43, curable by the radiation from the apparatus 10, is disposed in a bath 40. The radiation-facing surface 45 of the photosensitive resin 43 is substantially perpendicular to the direction of the reflected rays R. This arrangement allows to produce the framework 48 having conduits with essentially bilaterally symmetrically-tapered walls. A reinforcing structure 50 is positioned in the bath 40 filled with the liquid photosensitive resin 43. During the curing (i. e., solidification) of the resin 43, the reinforcing structure 50 becomes joined to, or encased in, the resinous framework 48 comprised of the cured resin 43. In FIG. 2, the dashed lines 44 schematically indicate would-be walls of the conduits of the would-be resinous framework 48 comprised of the cured resin 43.

The mask 46 having opaque regions 46a and transparent regions 46b of a preselected pattern is positioned between the source of radiation 20 and the radiation-facing surface 45 of the photosensitive resin 43. Preferably, the mask 46 is in contacting relation with the radiation-facing surface 45 of the photosensitive resin 43. Alternatively, the mask 46 may be positioned at a finite distance from the radiation-facing surface 45 of the resin 43. The mask can be made from any suitable material which can be provided with the opaque regions 46a and transparent regions 46b.

While the preferred subtractive collimator 47 positioned between the mask 46 and the source of radiation 20 is shown in FIG. 2, other means of controlling the direction and intensity of the curing radiation may alternatively or additionally be utilized. The other means of controlling the intensity and direction of the curing radiation include refractive devices (i. e., lenses), and reflective devices (i. e., mirrors).

Although the arrangement shown in the FIG. 2 includes the bath 40 containing the liquid photosensitive resin 43 and the reinforcing structure 50, other arrangements utilizing the apparatus 10 of the present invention may be feasible and even preferred. One preferred example is a continuous process disclosed in the commonly assigned U.S. Pat. No. 5,514,523 referenced hereabove. In the continuous process, a coating of a liquid photosensitive resin is preferably applied to the reinforcing structure 50 preferably comprising an endless loop. Also, in the continuous process, the mask 46 preferably comprises an endless loop traveling in the same direction as the loop of the reinforcing structure 50 does. Suitable photosensitive resins and antioxidants are described in the above-referenced U.S. Pat. No. 5,514,523 incorporated by reference herein.

The apparatus 10 of the present invention can be used for curing the photosensitive resin 43 to produce different types of the resinous framework 48. For example, U.S. Pat. No. 4,528,239 and U.S. Pat. No. 4,529,480 referenced above disclose the framework having an essentially continuous network. At the same time, the commonly assigned U.S. Pat. No. 5,245,025 issued to Trokhan et al. on Sep. 14, 1993 and U.S. Pat. 5,527,428 issued to Trokhan et al. on Jun. 18, 1996 disclose the framework comprised of patterned array of protuberances. The foregoing patents are incorporated herein by reference for the purpose of showing different types of the framework 48 which could be produced using the apparatus 10 of the present invention.

What is claimed is:

1. An apparatus for curing a photosensitive resin, said apparatus comprising:

a source of radiation; and an elongate reflector having a longitudinal axis, two ends spaced apart in a longitudinal direction parallel to said longitudinal axis, and a concave cross-section having a cross-sectional axis perpendicular to said longitudinal axis, said reflector further having an inner surface and an outer surface, said inner surface comprising a plurality of reflective facets oriented in and parallel to said longitudinal direction, said reflective facets having a common focal point in said cross-section for directing said radiation substantially parallel to said cross-sectional axis, said source of radiation being oriented in said longitudinal direction and juxtaposed with said common focal point in said cross-section.

2. The apparatus according to claim 1, wherein said common focal point of said reflective facets is located at said cross-sectional axis of said reflector.

3. The apparatus according to claim 2, wherein said source of radiation is disposed at said focal point in said cross-section.

4. The apparatus according to claim 3, wherein said source of radiation comprises an elongate bulb disposed between said first end and said second end of said reflector and parallel to said longitudinal axis of said reflector.

5. The apparatus according to claim 4, wherein said inner surface of said concave reflector has a parabolic macroscale shape in said cross-section.

6. The apparatus according to claim 4, wherein said inner surface of said concave reflector has a circular macro-scale shape in a paraxial region in said cross-section.

7. The apparatus according to claims 5 or 6, wherein said plurality of reflective facets comprises planar reflective facets.

8. The apparatus according to claims 5 or 6, wherein said plurality of reflective facets comprises curvilinear reflective facets.

9. The apparatus according to claim 1, wherein a liquid photosensitive resin having a radiation-facing surface is disposed in the direction of said radiation, said photosensitive resin being curable by said radiation.

10. The apparatus according to claim 9, wherein a reinforcing structure is disposed in the direction of said radiation and adjacent to said resin, said reinforcing structure to be joined to said resin.

11. The apparatus according to claim 10, wherein a mask having opaque regions and transparent regions is positioned between said source of radiation and said radiation-facing surface of said photosensitive resin.

12. The apparatus according to claim 11, wherein a collimator is positioned intermediate said radiation source and said radiation-facing surface of said resin.

13. The apparatus according to claim 3, wherein said reflective facets are adjunct facets.

14. The apparatus according to claim 13, further comprising a mounting frame for joining said adjunct facets to said reflector.

15. The apparatus according to claims 3 or 13, wherein said reflective facets are integral facets.

16. An apparatus for curing a photosensitive resin, said apparatus comprising:

a source of radiation, and an elongate reflector having a longitudinal axis, two ends spaced apart in a longitudinal direction parallel to said longitudinal axis, and a concave cross-section having a cross-sectional axis perpendicular to said longitudinal axis, said reflector further having an inner surface formed by a plurality of reflective facets oriented in said longitudinal direction, and an outer surface, said inner surface having a substantially parabolic macroscale shape in said cross-section for directing said radiation substantially parallel to said cross-sectional axis, said source of radiation being oriented along said longitudinal axis.

17. An apparatus for curing a photosensitive resin, said apparatus comprising:

a source of radiation, and an elongate reflector having a longitudinal axis, two ends spaced apart in a longitudinal direction parallel to said longitudinal axis, and a concave cross-section having a cross-sectional axis perpendicular to said longitudinal axis, said reflector further having an inner surface and an outer surface, said inner surface being formed by a plurality of reflective facets oriented in said longitudinal direction and having a common focal point in said cross-section for directing said radiation substantially parallel to said cross-sectional axis, at least part of said inner surface having a substantially circular macro-scale shape in said cross-section, said source of radiation being oriented along said longitudinal axis.

* * * * *

UNITED STATES PATENT AND TRADEMARK OFFICE
CERTIFICATE OF CORRECTION

PATENT NO. : 5,832,362
DATED : NOVEMBER 3, 1998
INVENTOR(S) : PAUL DENNIS TROKHAN

It is certified that error appears in the above-identified patent and that said Letters Patent is hereby corrected as shown below:

Column 2, line 14, delete "bcit" and insert therefor -- belt --.

Column 7, line 46, delete "convergeldiverge" and insert therefor -- converge/diverge --.

Signed and Sealed this

Eighteenth Day of May, 1999

*Attest:*

Q. TODD DICKINSON

*Attesting Officer*    Acting Commissioner of Patents and Trademarks